United States Patent [19]

Schalles et al.

[11] 3,974,721

[45] Aug. 17, 1976

[54] MULTIPLE-SPINDLE MACHINE TOOL

[75] Inventors: Erhard Schalles, Ubbedissen; Werner Latten, Oerlinghausen; Reinhard Stender, Sennestadt, all of Germany

[73] Assignee: Gildemeister Aktiengesellschaft, Bielefeld, Germany

[22] Filed: Feb. 28, 1975

[21] Appl. No.: 554,320

[30] Foreign Application Priority Data
Mar. 1, 1974  Germany............................ 2409773

[52] U.S. Cl. .................................................. 82/3
[51] Int. Cl.² ......................................... B23B 3/34
[58] Field of Search ....................................... 82/3

[56] References Cited
UNITED STATES PATENTS

| 905,680 | 1/1908 | Farrier | 82/3 |
|---|---|---|---|
| 2,611,290 | 9/1952 | Bullard | 82/3 |
| 2,691,312 | 10/1954 | Stewart | 82/3 X |
| 2,817,990 | 12/1957 | Miller | 82/3 |
| 3,365,989 | 1/1968 | Bullard et al. | 82/3 |
| 3,635,109 | 1/1972 | Jacobson | 82/3 |
| 3,726,162 | 4/1973 | Yoshikazu et al. | 82/3 |

FOREIGN PATENTS OR APPLICATIONS

| 1,419,046 | 8/1966 | France | 82/3 |
|---|---|---|---|
| 742,342 | 11/1943 | Germany | 82/3 |
| 618,760 | 9/1935 | Germany | 82/3 |

*Primary Examiner*—Harrison L. Hinson
*Attorney, Agent, or Firm*—Michael J. Striker

[57] ABSTRACT

A machine tool wherein the carrier for several rotary work spindles is separably mounted on a base in such a way that the chucks of two spindles are spaced apart by equal distances from horizontal ways for two side slides each of which mounts a carriage for an indexible tool turret. If the treatment of a workpiece at one of the working stations takes up more time than the treatment of a workpiece at the other working station, the tools which have completed the treatment of a workpiece at the other station are moved to the one station to cooperate with the other tools in rapidly completing the treatment of the workpiece at the one station. The carrier may be a box-like structure with two spindles or a drum having more than two work spindles and being indexible in a headstock, which is separably secured to the base.

10 Claims, 3 Drawing Figures

MULTIPLE-SPINDLE MACHINE TOOL

BACKGROUND OF THE INVENTION

The present invention relates to automatic or semiautomatic multiple-spindle machine tools in general, and more particularly to improvements in camless programoperated multiple-spindle machine tools wherein several workpieces can be treated simultaneously by tools mounted on cross slides or side slides.

It is already known to provide a multiple-spindle machine tool with a carrier which is indexible in a headstock of the machine frame and supports several parallel rotary work spindles. The carrier can be indexed between several positions in each of which different spindles are located at two discrete working stations where the workpieces are subjected to different treatments by one or more tools while being held by the chucks or analogous work-gripping portions of the spindles. As a rule, or at least in many instances, the treatment of a workpiece at one of several working stations takes up more time than the treatment of a workpiece at another working station; therefore, the intervals at which the carrier is indexed are determined by the longest period which is needed to complete the removal of material from a workpiece at a particular station. The periods of time which are needed to treat workpieces at several discrete working stations are different when the workpieces are treated in an automatic of the type disclosed in U.S. Pat. No. 3,643,307 to Ledergerber et al. This patent discloses an automatic wherein the carrier supports four work spindles two of which are located at working or material removing stations and two of which are located at additional stations where the workpieces are inserted, finished workpieces removed and partially treated workpieces transferred with simultaneous turning end-for-end.

It was already proposed to reduce the differences in the length of periods which are needed to treat workpieces at different working station in a multiple-spindle automatic. Such proposals include the making of deeper cuts and/or increasing the rate of feed at the time a tool engages a workpiece. However, the just described mode of machining workpieces results in excessive wear upon the tools and reduces the accuracy and reproducibility of treatment.

SUMMARY OF THE INVENTION

An object of the invention is to provide a multiple-spindle machine tool wherein the periods of time which are necessary to complete the longest treatment of workpieces at one of several working stations are shorter than in heretofore known machine tools even if workpieces at one of several working stations require a treatment which is much more extensive and complex than that at the other working station or stations.

Another object of the invention is to achieve the just outlined shortening of periods of treatment of workpieces at a particular station without excessive wear upon the tools and with a degree of reproducibility and accuracy which matches that in conventional machine tools wherein the periods of treatment of workpieces at different working stations are widely different.

A further object of the invention is to provide novel and improved tool supporting means for use in a multiple-spindle machine tool wherein two workpieces are treated simultaneously at two discrete working stations.

An additional object of the invention is to provide a multiple-spindle machine tool wherein the tools can be utilized with greater economy than in conventional multiple-spindle machines.

The invention is embodied in a multiple-spindle machine tool, particularly in a camless program-operated machine tool, which comprises a frame (such frame may include a base and a spindle carrier directly but separably mounted on the base or a base, a headstock or support directly but separably mounted on the base, and a spindle carrier which is indexible in the headstock), a plurality of parallel work spindles rotatably mounted in the frame (i.e., in the carrier) and including first and second work spindles having chucks or analogous work-gripping portions respectively located at first and second working or treating stations which are disposed in front of the carrier, elongated ways or analogous guide means provided on the frame adjacent to the work-gripping portions of the first and second spindles and preferably disposed in front of the working stations in such position that the axes of the first and second spindles are spaced apart from the guide means by identical distances, and tool supporting means mounted in and reciprocable independently of each other along the guide means so that tools held by either of the tool supporting means can reach and treat a workpiece at either of the two working stations or that the tools held by one of the tool supporting means can treat a workpiece at the first working station and the tools held by the other work supporting means can treat a workpiece at the first or second working station.

Each of the tool supporting means may comprise a cross slide which is movable along the guide means at right angles to the axes of the spindles, a carriage mounted on and movable relative to the respective slide in parallelism with the axes of the spindles, and a tool turret mounted on and indexible on the carriage about an axis which is normal to the axes of the spindles. The path which is defined by the guide means is preferably a straight path which is normal to and crosses in space with the axes of the first and second work spindles. At least one of the turrets preferably comprises overhead tool holders.

The novel features which are considered as characteristic of the invention are set forth in particular in the appended claims. The improved machine tool itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
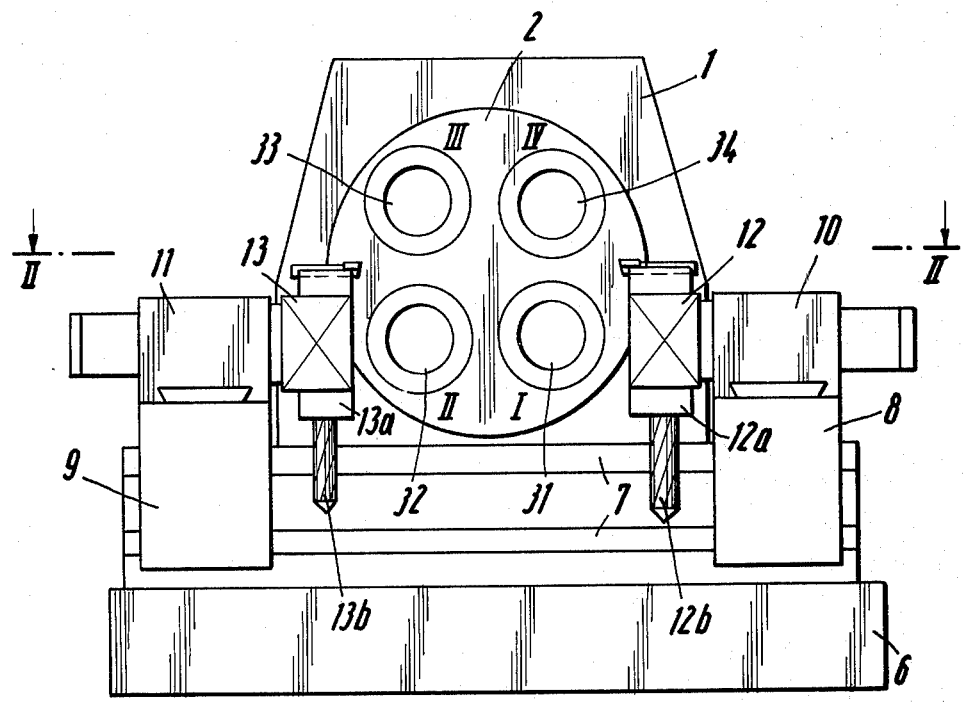
FIG. 1 is a schematic front elevational view of a machine tool having four work spindles and embodying one form of the invention.
Figure 2:
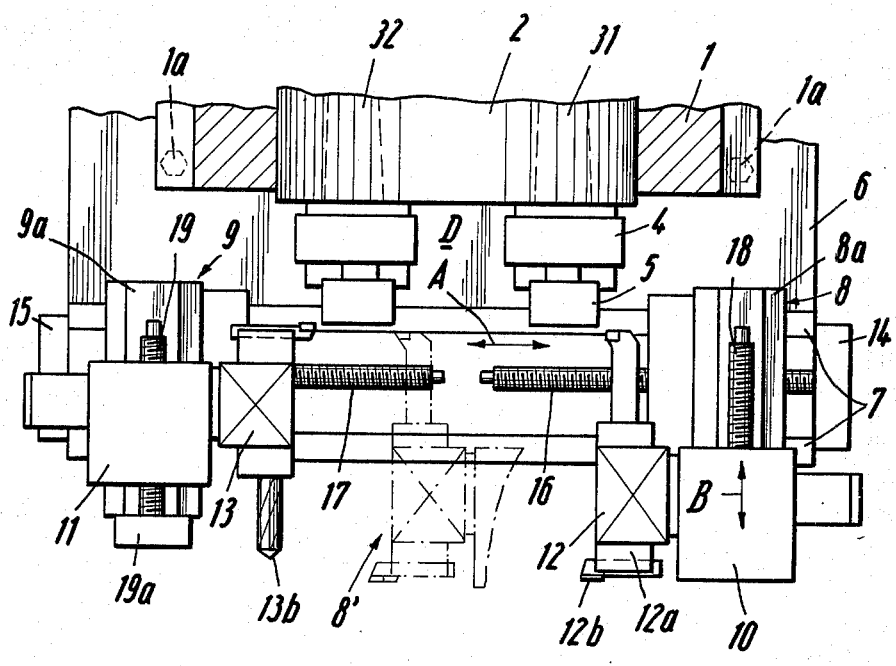
FIG. 2 is a fragmentary horizontal sectional view as seen in the direction of arrows from the line II—II of FIG. 1.

Referring first to FIGS. 1 and 2, there is shown a portion of a machine tool with four working spindles 31, 32, 33 and 34. These spindles are rotatable in a cylindrical spindle carrier 2 mounted in a stationary support or headstock 1 which is separably secured to a base or bed 6. The means for separably securing the support 1 to the base 6 comprises bolts 1a or analogous fasteners. The four work spindles 31 – 34 are equally spaced from each other and from the axis of rotation of the carrier 2. The parts 1 and 6 constitute components of a frame wherein the spindles 31 – 34 in the carrier 2 are rotatable about horizontal axes. The means for indexing the carrier 2 in the support 1 and for rotating the spindles 31 – 34 in the carrier 2 are of conventional design and are not shown in the drawing. As a rule, it suffices to provide means which rotate only the work spindles (see the spindles 31, 32 in FIG. 1) which are located at the two working stations I and II. Those portions of the work spindles 31 – 34 which extend forwardly beyond the carrier 2 have chucks 4 or analogous work-gripping portions for metallic workpieces 5. The chucks 4 are located in a work treating area D disposed above elongated horizontal guide means or ways 7 mounted on the base 6 and extending at right angles to the axes of spindles 31 – 34 and carrier 2. When the carrier 2 is at a standstill, two of the spindles 31 – 34 are located at the working stations I, II and such spindles are equally spaced from the ways 7. As mentioned above, the support 1 is a discrete (separately produced) component of the frame which is separably fastened to the base 6.

The ways 7 support two tool supporting means including cross slides or side slides 8, 9 which are movable along a straight path in directions indicated by a double-headed arrow A. In the embodiment which is shown in FIGS. 1 and 2, the axes of the carrier 2 and spindles 31 – 34 are horizontal and the ways 7 define a horizontal path for the cross slides 8 and 9. The cross slides 8, 9 are respectively provided with guide means or ways 8a, 9a for carriages 10, 11 which are movable in parallelism with the axis of the carrier 2, i.e., up or down, as viewed in FIG. 2 (see the arrow B). The carriages 10, 11 respectively support tool turrets 12, 13 which are indexible about axes extending in parallelism with the ways 7. The holders 12a, 13a of the turrets 12, 13 respectively support interchangeable tools 12b, 13b serving to remove material from workpieces 5 at the station I and/or II.

The means for moving the cross slides 8, 9 lengthwise of the ways 7 comprises two elongated feed screws 16, 17 in mesh with spindle nuts (not shown) on the corresponding cross slides, and drives 14, 15 for rotating the feed screws 16, 17. The means for moving the carriages 10, 11 along the ways 8a, 9a comprises feed screws 18, 19 in mesh with spindle nuts (not shown) on the corresponding carriages and drives which rotate the feed screws 18, 19. FIG. 2 merely shows the drive 19a for the feed screw 19. The means for indexing the turrets 12, 13 are installed in the respective carriages 10, 11. Each of the drives for moving the cross slides 8, 9 and carriages 10, 11 can be operated independently of the others, and each of the indexing means for the turrets 12, 13 can be operated independently of the other by a suitable programming system, not shown.

The tools 13b on the turret 13 can be used to remove material from a workpiece 5 at the working station I or II, and this also applies for the tools 12b on the turret 12. For example, if the tools 12b are to treat a workpiece at the working station II, the carriage 10 is retracted (moved downwardly, as viewed in FIG. 1) to such an extent that the tools 12b on the turret 12 can bypass a workpiece 5 at the working station I. In the machine tool of FIGS. 1 and 2, the workpieces 5 which are held by the chucks 4 of the spindles occupying two additional stations III and IV are not treated by any tools, i.e., the support 1 and/or the base 6 need not be provided with any slides or holders for tools which could engage workpieces at the stations III and IV.

The operation is as follows:

It is assumed that the carrier 2 has been indexed to the position shown in FIG. 1; thus, the chucks 4 of the spindles 31, 32, 33 and 34 are respectively located at the stations I, II, III and IV. One side of the workpiece 5 in the chuck 4 of the spindle 33 at the station III is assumed to be finished. Such workpiece is automatically removed from the chuck of the spindle 33, automatically turned end-to-end, and automatically inserted into the empty chuck of the spindle 34 at the station IV. A fresh workpiece 5 is thereupon inserted into and gripped by the chuck of the spindle 33. At the same time, one or more tools 12b and 13b respectively treat workpieces 5 which are held by the chucks of the spindles 31, 32 at the working stations I and II. When such treatment is completed, the tools 12b and 13b are withdrawn sufficiently to allow for indexing of the carrier 2 and the latter is thereupon indexed through 180 degrees so that the spindles 33, 34 are respectively moved to the working stations I and II. The tools 13b are then caused to treat the other side of the workpiece 5 in the chuck 4 of the spindle 34, and the tools 12b are caused to treat one side of the fresh workpiece 5 which is held in the chuck 4 of the spindle 33 at the working station I.

At the same time, a finished workpiece 5 is removed from the chuck 4 of the spindle 32 at the station IV to provide room for insertion of the semifinished workpiece which is still gripped by the chuck of the spindle 31 at the station III. The semifinished workpiece is thereupon removed from the chuck of the spindle 31, turned end-for-end, and inserted into the chuck of the spindle 32 at the station IV.

When the treatment of workpieces in the chucks of spindles 33, 34 at the working stations I and II is completed, the carrier 2 is indexed through 180 degrees so as to return the spindles 31 – 34 to the positions shown in FIG. 2. The finished workpiece is removed from the chuck of the spindle 34 at the station IV: the semifinished workpiece is thereupon removed from the chuck of the spindle 33 at the station III, turned end-for-end, and inserted into the chuck of the spindle 34 at the station IV: one side of a fresh workpiece in the chuck of the spindle 31 is treated at the working station I; and the other side of a semifinished workpiece is treated in the chuck of the spindle 32 at the working station II. The same procedure is repeated again and again, as long as necessary. Thus, finished workpieces are removed from the spindle 32 or 34 at the station IV, semifinished workpieces are transferred from the spindle 31 into the spindle 32 or from the spindle 33 into the spindle 34 by moving them from the station III to the station IV (and by simultaneously inverting such semifinished workpieces), fresh workpieces are inserted into the spindle 31 or 33 at the station III subsequent to removal of semi-finished workpieces, fresh workpieces are converted into semi-finished workpieces at the working station I, and semi-finished workpieces are converted into finished workpieces at the working station II.

If the nature of treatments of workpieces at the working stations I and II is such that the treatment of one side of a workpiece at the station I takes up less time than the treatment of a workpiece at the station II, the tools 12b can be used to assist the tools 13b in completing the treatment of the workpiece at the station II. Thus, when necessary, the carriage 10 is withdrawn (moved downwardly, as viewed in FIG. 2) to the extent which is needed to insure that the tools 12b will bypass the semifinished workpiece at the station I while the cross slide 8 moves toward the station II. When the slide 8 reaches the phantom-line position 8' of FIG. 2, the tools 12b on the turret 12 can reach and remove material from the workpiece at the station II. Analogously, if the treatment of workpieces at the working station I takes up more time than the treatment of workpieces at the working station I, the tools 13b are retracted upon completion of treatment of the workpiece at the station II and the cross slide 9 is thereupon moved toward the cross slide 8 so that one or more tools 13b can reach and remove material from the workpiece at the station I.

In addition to heretofore described advantages of the machine tool shown in FIGS. 1 and 2, this machine tool can be used with substantial savings in expenditures for special and/or highly expensive tools. Thus, if a tool is used only infrequently and/or if a tool is very expensive, it is mounted only in the turret 12 or 13 and the latter is thereupon moved to a position in which such infrequently used or expensive tool can treat a workpiece at the working station I or II.

The stations III and IV are readily accessible from the front side of the machine tool so that the workpieces can be inserted, removed, turned around and/or otherwise manipulated by resorting to conventional automatic or semiautomatic work feeding, removing and inverting accessories. The tools on the turrets 12 and 13 are also readily accessible for inspection, interchange, removal or replacement.

Figure 3:
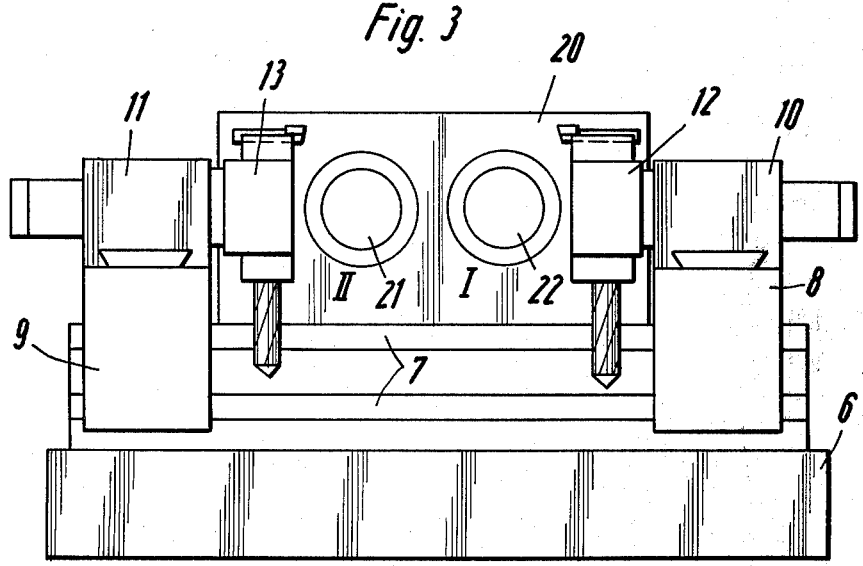
FIG. 3 is a schematic front elevational view of the machine tool, but with the indexible carrier for four work spindles replaced by a non-indexible carrier for two spindles.

FIG. 3 shows a portion of the heretofore described machine tool but with the support 1 and indexible carrier 2 for four spindles 31 –to 34 replaced by a substantially box-like non-indexible carrier 20 which is removably secured to the base 6 by bolts or analogous fasteners, not shown. The carrier 20 supports two parallel work spindles 21, 22 which are located at the working stations II and I as long as the carrier 20 remains fastened to the base 6. This simplified machine tool can be used with advantage for treatment of workpieces which need not be turned around end-for-end and which need not be indexed to move from the working station I to the working station II or vice versa. The manner in which the ways 7 are mounted on the base 6 (at right angles to the axes of spindles 21, 22) and in which the cross slides 8, 9 are mounted in the ways 7 is the same as described in connection with FIGS. 1 and 2. The cross slides 8, 9 respectively support carriages 10, 11, and these carriages respectively support indexible turrets 12, 13. The distance between the ways 7 and the axis of the spindle 21 is identical with that between the ways 7 and the axis of the spindle 22.

The carrier 20 can be used interchangeably with the carrier 2 and support 1 of FIGS. 1 – 2. Therefore, the distance between the axes of the spindles 21, 22 preferably equals or closely approximates the distance between the axes of two neighboring spindles in the carrier 2, and the distance between the spindle 21 or 22 of FIG. 3 and the ways 7 preferably equals the distance between the ways 7 shown in FIGS. 1 – 2 and those spindles whose chucks 4 are located at the working stations I and II. Such dimensioning of the carrier 20 contributes to versatility of the basic machine tool because the construction and mounting of parts 6–19a remain unchanged irrespective of whether the machine tool is used with two or more spindles. Moreover, such construction reduces the overall cost of the machine tool. The carrier 2 or 20 can be said to constitute a component part of the frame of the machine tool.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptions should and are intended to be comprehended within the meaning and range of equivalence of the claims.

We claim:

1. A machine comprising the combination of a frame having first and second work stations; first and second work spindles mounted on said frame in said first and second stations, respectively, and having respective first and second workpiece-holding chucks defining respective first and second working axes lying in said first and second stations respectively; an elongated guide on said frame extending past said first and second stations and equispaced from said first and second axes; a pair of tool holders independently displaceable along said guide; and means for displacing said holders independently of each other for positioning each of said holders in either of said stations, whereby a workpiece in either station can be worked by a tool in either holder.

2. A combination as defined in claim 1 wherein each of said tool holders comprises a cross slide.

3. A combination as defined in claim 1, wherein said guide defines for said tool holder a straight path which is normal to and crosses in space with said axes of said spindles.

4. A combination as defined in claim 1, wherein at least one of said tool holders is an overhead tool holder.

5. A combination as defined in claim 1, wherein at least one of said tool holders comprises an indexible turret.

6. A combination as defined in claim 5, wherein said turret is indexible about an axis which is parallel to said guide.

7. A combination as defined in claim 1, wherein said frame comprises a base, a carrier for said spindles, and means for separably mounting said carrier on said base, said guide being mounted on said base.

8. A combination as defined in claim 7, wherein said carrier is indexible with respect to said base about an axis which is parallel to said axes of said spindles, the total number of said spindles exceeding two and said carrier being indexible between at least two positions in each of which different spindles are located at said stations.

9. A combination as defined in claim 1, wherein each of said tool holders comprises a slide movable lengthwise of said guide at right angles to the axes of said spindles, a carriage mounted on and movable relative to the respective slide in parallelism with the axes of said spindles, and a tool turret mounted on and indexible relative to the respective carriage about an axis which is normal to the axes of said spindles.

10. A combination as defined in claim 1, wherein the axes of said spindles are horizontal and said guide includes horizontal ways disposed in front of said work stations.

* * * * *